(12) United States Patent
Nishimura et al.

(10) Patent No.: US 8,726,096 B2
(45) Date of Patent: *May 13, 2014

(54) CONTROLLER AND CONTROL METHOD FOR A CONTROLLER

(71) Applicant: Seiko Epson Corporation, Tokyo (JP)

(72) Inventors: Nobuhiro Nishimura, Ueda (JP); Toshihiro Hagiwara, Ueda (JP); Eiji Ito, Nagano (JP); Atsushi Sakai, Sakaki-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/888,285

(22) Filed: May 6, 2013

(65) Prior Publication Data
US 2013/0246844 A1    Sep. 19, 2013

Related U.S. Application Data

(63) Continuation of application No. 12/789,392, filed on May 27, 2010, now Pat. No. 8,468,392.

(30) Foreign Application Priority Data

May 28, 2009    (JP) .................................. 2009-128441

(51) Int. Cl.
*G06F 11/00*    (2006.01)
(52) U.S. Cl.
USPC .............................. 714/44; 714/5.1; 719/327
(58) Field of Classification Search
USPC ............. 714/2, 5.1, 15, 21, 38.1, 44; 719/327
See application file for complete search history.

(56) References Cited

U.S. PATENT DOCUMENTS

| 6,889,380 | B1 | 5/2005 | Shah |
| 7,853,728 | B2 | 12/2010 | Vageline et al. |
| 2006/0129971 | A1 | 6/2006 | Rojer |
| 2006/0242402 | A1 | 10/2006 | Swift et al. |
| 2012/0167122 | A1* | 6/2012 | Koskimies .................... 719/328 |

FOREIGN PATENT DOCUMENTS

| JP | 08-272492 A | 10/1996 |
| JP | 11-265267 A | 9/1999 |
| JP | 2004-348414 A | 12/2004 |

* cited by examiner

*Primary Examiner* — Joseph D Manoskey
(74) *Attorney, Agent, or Firm* — Kilpatrick Townsend & Stockton LLP

(57) ABSTRACT

A controller and a control method for a controller can simplify application development and can improve the performance of device control processes. When a request is received from an application 1 and the received process request is an initialization request, whether or not the received request is the first initialization request received after the application 1 started running is determined. If the received initialization request is the first initialization request, the request is passed to the device driver 3 and initialization settings information describing the configuration of the device driver 3 after the initialization process ends is stored. If an error has occurred in the device driver 3 when the device driver 3 status is detected, an error handling process is executed according to the device driver 3 state. When the device driver 3 has recovered, a request for setting the device driver 3 state to the state based on the initialization settings information is asserted.

6 Claims, 5 Drawing Sheets

CONTROLLER AND CONTROL METHOD FOR A CONTROLLER

This application is a continuation of U.S. application Ser. No. 12/789,392, filed May 27, 2010, which claims priority under 35 U.S.C. §119 to Japanese Patent Application No. 2009-128441 filed on May 28, 2009, the entire disclosure of which are expressly incorporated by reference herein.

BACKGROUND

1. Technical Field

The present invention relates to a controller that intervenes between an application program ("application" below) and a device driver, and to a method of controlling the controller.

2. Related Art

In order to control a device, such as a printer, that is connected to a computer, a device driver for that device is generally used. See, for example, Japanese Unexamined Patent Appl. Pub. JP-A-H11-265267. Such device drivers are for controlling the corresponding device, and provide an input/output interface with multiple control options (referred to as simply "interface" below). By using the interface provided by the device driver when developing an application, device operations can be controlled and error handling processes can be written according to the state of the device.

In order to control such a device, however, an extremely large number of functions for controlling the device and numerous processes for handling errors caused by the device are generally required in the device driver interface. As a result, using a device driver to enable detailed device control and handle errors complicates the flow of application processes. Application development costs increase as a result.

Batch processing, for example, is also conceivable as a means of avoiding complicating the flow of application processes. More specifically, an error handling process that always simply reinitializes all functions of the device driver can be used to recover from an error without considering the possible causes of the error or the state of the device or device driver when an error occurs. However, because reinitializing all functions of the device driver is generally time-consuming, executing the re-initialization process every time an error occurs can reduce the performance of the device driver.

SUMMARY

A first aspect of the present invention is a controller that intervenes between an application and a device driver, can simplify application development, and can improve the performance of processes controlling the device. Another aspect of the present invention is a control method for the controller.

A first aspect of the invention is a control method for a controller that is a module that intervenes between an application and a device driver, relays a request from the application to the device driver, and relays a response to the request from the device driver to the application, the control method including steps of: receiving the request from the application; determining if a received initialization request is the first initialization request received after the application started when the received request is an initialization request; sending the first initialization request to the device driver if the initialization request is determined to be the first initialization request; acquiring from the device driver initialization settings information describing the status of the device driver after the initialization process based on the first initialization request, and storing the initialization settings information; detecting the status of the device driver; executing a recovery process based on the device driver status if the device driver status is determined to be an error; and sending a request to the device driver to set the device driver to the state based on the stored initialization settings information when the device driver recovers from an error as a result of the recovery process.

Another aspect of the invention is a controller that is a module that intervenes between an application and a device driver, relays a request from the application to the device driver, and relays a response to the request from the device driver to the application, the controller having: a request reception unit that receives the request from the application; an initialization request evaluation unit that determines if a received initialization request is the first initialization request received after the application started when the received request is an initialization request; an initialization request processing unit that sends the first initialization request to the device driver if the initialization request evaluation unit determines that the initialization request is the first initialization request; an initialization settings information acquisition unit that acquires from the device driver initialization settings information describing the status of the device driver after the initialization process based on the first initialization request; an initialization settings information storage unit that stores the acquired initialization settings information; a status detection unit that detects the status of the device driver; a recovery process unit that executes a recovery process based on the device driver status if the status detection unit detects that the device driver is in an error state; and a set initialization settings request unit that sends a request to the device driver to set the device driver to the state based on the stored initialization settings information when the device driver recovers from an error as a result of the recovery process.

When a device driver error occurs in this aspect of the invention, the controller can execute an appropriate recovery process (error handling process) according to the status of the device driver (more specifically, according to the error type). As a result, the process flow of the application is therefore simplified because the application does not need to execute a detailed error handling process, and the cost of application development can be reduced.

Furthermore, the status of the device driver after the first initialization process (the initialization settings information) is stored on the controller side, and based on this initialization settings information the controller can reset the device driver to the same state as after the initialization process is executed after the device driver recovers from an error. As a result, in addition to multiple initialization processes not being necessary, an initialization process that takes a long time, such as to initialize communications or an instance, is unnecessary, and process performance can be improved by introducing a controller according to the invention to an application that executes an initialization process in an error handling process, for example.

In the control method for a controller according to another aspect of the invention a response to the initialization request is preferably returned to the application according to the device driver status without sending the initialization request to the device driver if as a result of evaluating the initialization request the received initialization request is determined to not be the first initialization request.

In a controller according to another aspect of the invention, the initialization request processing unit preferably returns a response to the initialization request to the application according to the device driver status without sending the initialization request to the device driver if the result of the evaluation by the initialization request evaluation unit is that the received initialization request is not the first initialization request.

In these aspects of the invention the controller returns a response to the initialization request without passing the initialization request from the application to the device driver. More specifically, the device driver does not execute the initialization process (such as a process that actually initializes communications or an instance). As a result, process performance can be improved by introducing a controller according to the invention to an application that requests an initialization process at a specific timing every time the same device control process is executed, and to an application that executes an initialization process in an error handling process.

In a controller and a control method for a controller according to these aspects of the invention the specifications of the controller interface are preferably the same as the device driver interface specifications, or extend the device driver interface specifications.

These aspects of the invention enable the controller to provide an interface with the same specifications or an extension of the specifications of the device driver interface. As a result, a drop in application development efficiency can be prevented because the application developer does not need to learn the specifications of a new interface, and application development can proceed as if using the same interface provided by an existing device driver.

In a controller and a control method for a controller according to further aspects of the invention, the request defines a batch of plural requests.

In a controller and a control method for a controller according to further aspects of the invention, the request is defined in a markup language.

By introducing a controller or a control method for a controller according to these aspects of the invention to an application that cannot execute a detailed error handling process, such as an application that defines a plurality of requests in XML (eXtensible Markup Language) and batch processes the requests, errors can be handled by appropriate error handling processes and development of such batch processing applications is made easier.

Other objects and attainments together with a fuller understanding of the invention will become apparent and appreciated by referring to the following description and claims taken in conjunction with the accompanying drawings.

DESCRIPTION OF EMBODIMENTS

Figure 1:
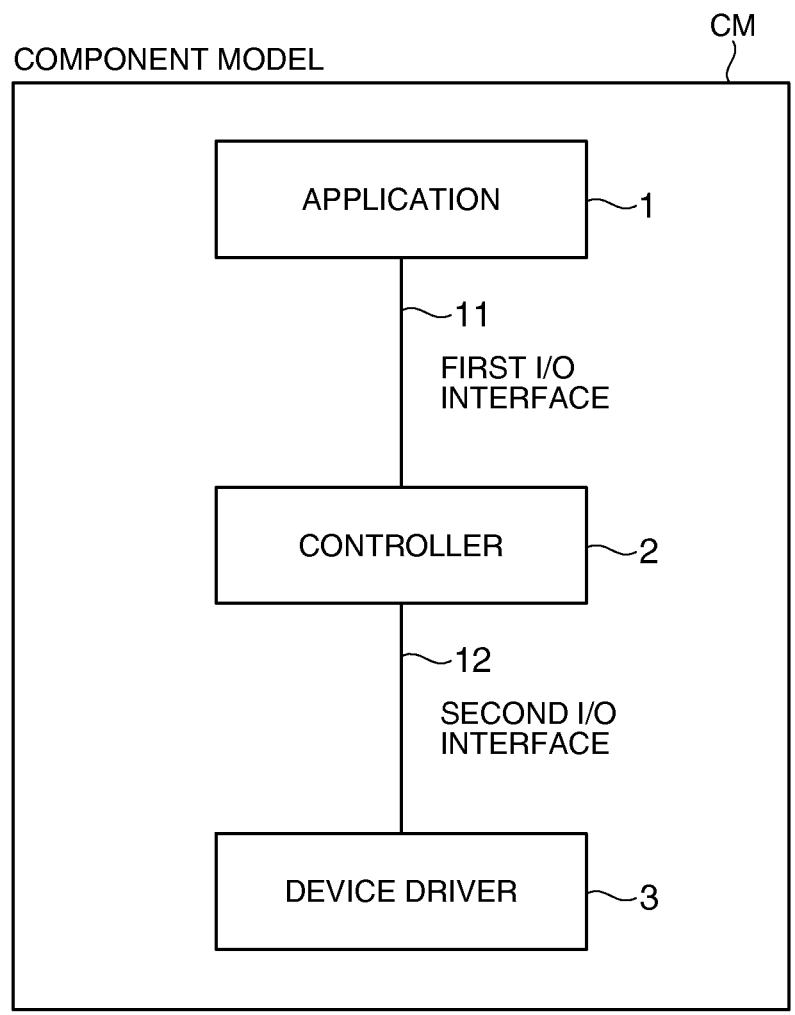
FIG. 1 is a block diagram showing the configuration of a component model according to a preferred embodiment of the invention.

A component model including a controller according to a preferred embodiment of the invention is described below with reference to the accompanying figures. FIG. 1 is a block diagram showing the configuration of a component model CM according to this embodiment of the invention. As shown in the figure, the component model CM includes an application 1, a controller 2, and a device driver 3. Note that the application 1, the controller 2, and the device driver 3 are rendered as software modules that operate under the operating system (OS) of a computer.

The application 1 is a program that asserts requests for a device (such as a printer, not shown in the figures) that is connected to the computer to execute a specific operation, and requests related to an error handling process when an error occurs during a process of the device driver 3. These requests are defined using an interface (first input/output (I/O) interface 11) provided by the controller 2, and the application 1 sends requests to the controller 2 and receives responses (such as the success/failure of a process) to the requests from the controller 2. The device is communicably connected to the device driver 3.

The controller 2 is a module that resides between the application 1 and the device driver 3, and works as a bridge passing requests from the application 1 to the device driver 3 and passing responses to the requests from the device driver 3 to the application 1. More specifically, the controller 2 provides the first I/O interface 11 to the application 1, and using this first I/O interface 11 receives requests from the application 1 and returns responses to the requests to the application 1. The controller 2 passes requests from the application 1 to the device driver 3, and receives responses to the requests from the device driver 3, by using another interface (second I/O interface 12) provided by the device driver 3.

The device driver 3 is configured to control a particular device or devices, and is constructed based on the specifications of each device to be controlled. The device driver 3 provides the foregoing second I/O interface 12 to the controller 2, and using this second I/O interface 12 receives requests from the controller 2 and returns request responses to the controller 2.

Note that the specifications of the first I/O interface 11 provided by the controller 2 are the same as the specifications of the second I/O interface 12 provided by the device driver 3, or extend the specifications of the second I/O interface 12 by, for example, enabling XML compatibility. As a result, a drop in application 1 development efficiency is therefore prevented because the application developer does not need to learn the specifications of a new interface, and can continue development in the same way as when using the interface previously provided by the device driver 3.

Figure 2:
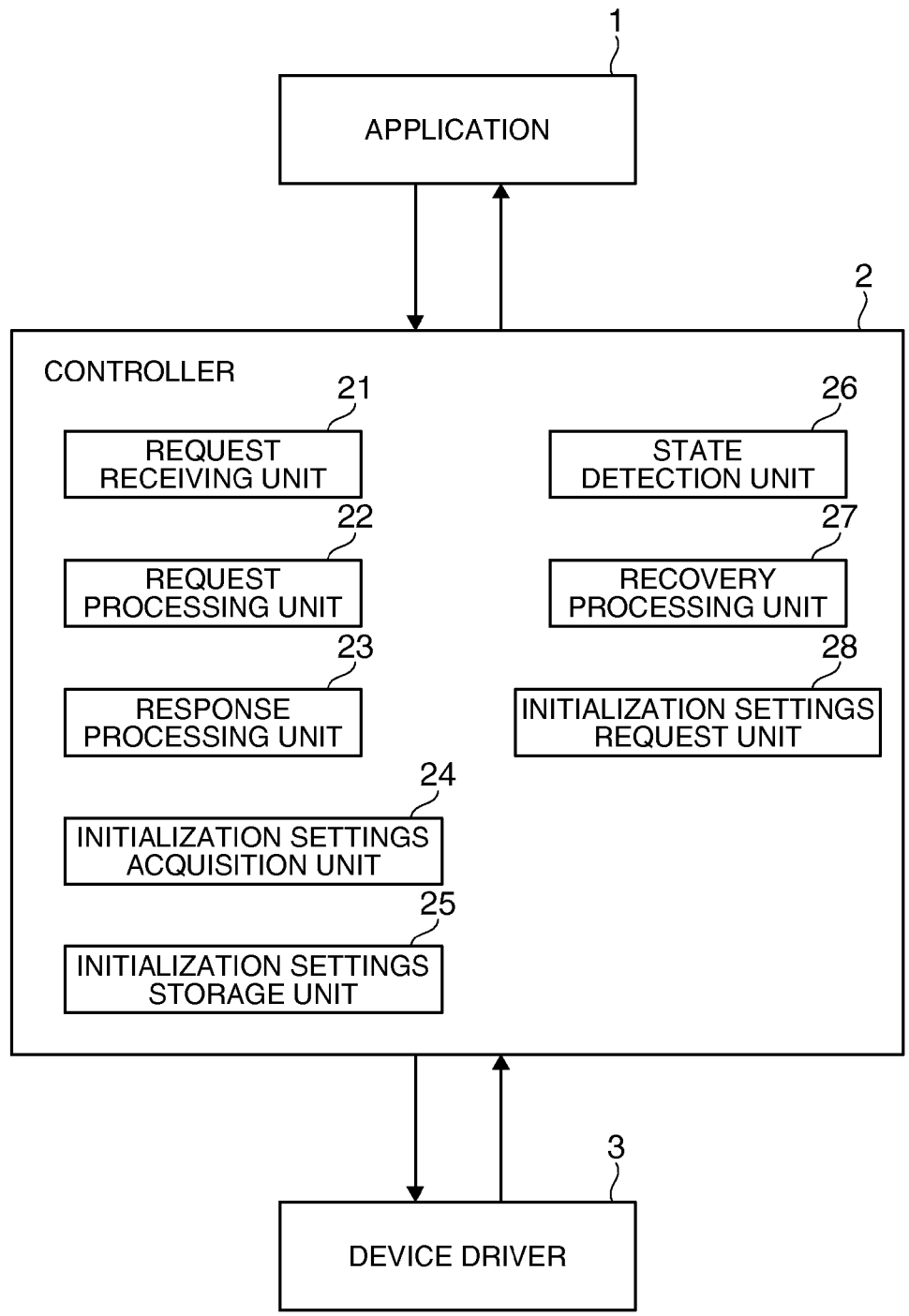
FIG. 2 is a function block diagram of the controller.

The functional configuration of the controller 2 is described next with reference to the function block diagram in FIG. 2. As shown in the figure, the controller 2 has a request receiving unit 21, a request processing unit 22, a response processing unit 23, an initialization settings acquisition unit 24, an initialization settings storage unit 25, a state detection unit 26, a recovery processing unit 27, and an initialization settings request unit 28.

The request receiving unit 21 functions as a unit that receives requests from the application 1. The request processing unit 22 functions to execute the appropriate process based on the content of the request received from the application 1 and the state of the device driver 3. More specifically, if the request from the application 1 is an initialization request, whether the initialization request is the first initialization request received since the application 1 was started is determined (initialization request evaluation unit). If it is the first initialization request received, this first initialization request is sent to the device driver 3 (initialization request processing unit). If it is not the first initialization request, the initialization request is not forwarded (sent) to the device driver 3, and a response to the initialization request is returned to the application 1 according to the state of the device driver 3 (initialization request processing unit).

If the request is a termination request to end a process, the termination request is not bridged to the device driver 3 and a response indicating the success of the process is returned to the application 1. If the request is neither an initialization request or a termination request (referred to below as a "normal request") and the device driver 3 is operating normally, the normal request is passed to the device driver 3, but if an error has occurred in the device driver 3, the normal request is not passed to the device driver 3 and a response reporting a failure of the normal request is returned to the application 1.

The response processing unit 23 functions to receive the response to the request from the device driver 3 and send the response to the application 1. That is, the response processing unit 23 functions as a bridge for responses from the device driver 3 going to the application 1.

The initialization settings acquisition unit 24 functions to acquire initialization settings information from the device driver 3. This initialization settings information is information about the state of the device driver 3 after the device driver 3 has executed the initialization process (a process that actually initializes communication or an instance) in response to the first initialization request from the application 1. This state is referred to below as the "initialized state." The initialization settings storage unit 25 functions to store (save) the acquired initialization settings.

The state detection unit 26 functions to detect the state of the device driver 3, sets its own status (more specifically the status of the controller 2) based on the response from the device driver 3 to the request, and can indirectly detect the status of the device driver 3 by checking this status setting. More specifically, if the response from the device driver 3 to the request is a response reporting that the requested process was successful, the state detection unit 26 sets its status to normal, and the device driver 3 detects that the operating state is normal by checking this status flag (normal state).

When the state detection unit 26 detects that an error has occurred in the device driver 3, the recovery processing unit 27 functions to execute the appropriate recovery process (such as sending a command to fix the error) based on the status of the device driver 3 (the error content).

The initialization settings request unit 28 functions to set the status of the device driver 3 to the state specified by the stored initialization settings when the device driver 3 has been recovered from an error by the recovery processing unit 27. As a result, the device driver 3 can be reset to the initialized state (the same state as after the initialization process) without actually executing a process to initialize communications or an instance.

A specific example of a process executed by the controller 2 is described next with reference to the sequence diagrams in FIG. 3 to FIG. 5.

Figure 3:
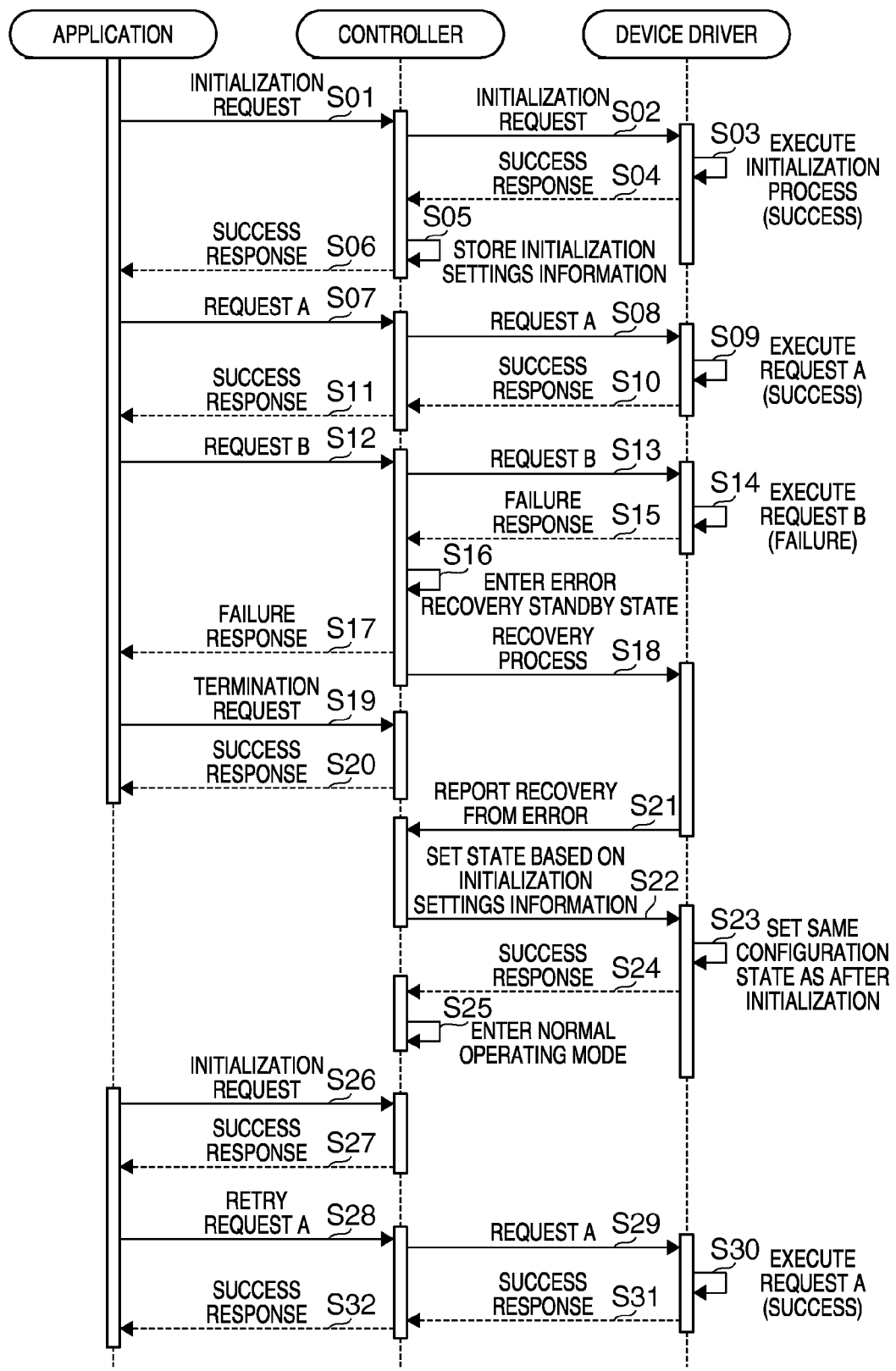
FIG. 3 is a sequence diagram describing an example of a controller process for an application that executes a general purpose error handling process.

FIG. 3 is an example of a sequence describing a process run by the controller 2 when the application 1 executes a general purpose error handling process. Note that a general purpose error handling process as used herein means a process in which the application 1 asserts a termination request and an initialization request irrespective of the error type and the status of the device driver 3 when a device driver 3 error occurs.

The application 1 first sends an initialization request for initializing the device driver 3 to the controller 2 (S01). The controller 2 determines if this initialization request is the first initialization request received after the application 1 started running (that is, whether the initialization request is the first initialization request received from the application 1). Because this is the first initialization request in this example, the controller 2 passes the initialization request to the device driver 3 (S02). The device driver 3 that receives the initialization request executes an initialization process based on the initialization request (such as initializing communication or an instance) (S03), and returns a response indicating that the initialization process succeeded (a "success response" below) to the controller 2 (S04).

The controller 2 that received the success response to the initialization request then acquires and stores the current status of the device driver 3, that is, the status immediately after the initialization process ends, as the initialization settings information (S05). The controller 2 then bridges the success response to the initialization request from the device driver 3 to the application 1 (S06).

Next, the application 1 asserts a request (request A) to the controller 2 for the device driver 3 to execute a specific process A (S07). The controller 2 that received the request A then checks its own status (normal or waiting for error recovery). More specifically, the controller 2 checks if an error occurred on the device driver 3 side. Because the controller 2 status at this time is normal (because the device driver 3 is operating normally), the controller 2 bridges the request A to the device driver 3 (S08).

The device driver 3 that received the request A then executes process A based on request A (S09), and returns a success response indicating that process A was completed successfully to the controller 2 (S10). The controller 2 then bridges the success response to request A from the device driver 3 to the application 1 (S11).

Next, the application 1 asserts a request (request B) for the device driver 3 to execute a specific request B (S12). The controller 2 receives the request B and checks its own status (normal or waiting for error recovery). Because the controller 2 status at this time is normal at this time (because the device driver 3 is operating normally), the controller 2 bridges the request B to the device driver 3 (S13).

The device driver 3 that received the request B then executes process B based on request B (S14). If at this time process B fails, the device driver 3 returns a response indicating that process B failed (a "failure response" below) to the controller 2 (S15). When the controller 2 receives this failure response to request B from the device driver 3, this failure response triggers the controller 2 to detect that an error occurred in the device driver 3 and change its own status to a waiting for error recovery status (S16). The controller 2 then bridges the failure response to request B to the application 1 (S17).

Next, the controller 2 checks the status (error content) of the device driver 3, and executes a particular recovery process based on the detected status (such as outputting a specific recovery command according to the type of the device driver 3 error) (S18).

The application 1 that receives this failure response to request B then asserts a request to terminate the process (a termination request) to the controller 2 in order to execute the error handling process (S19). As a result, without passing the process termination request to the device driver 3, the controller 2 then returns a success response indicating that the termination request was successful to the application 1 (S20).

When the device driver 3 recovers from the error as a result of the error handling process in step S18, the device driver 3 returns an error recovery report telling the controller 2 that the error has been corrected (S21). The controller 2 receives the error recovery report and asserts a request to reset the status of the device driver 3 to the configuration state based on the stored initialization settings (S22). As a result, the device driver 3 reinitializes (S23) (that is, restores the same configuration state that is set immediately after the initialization process is executed in step S03). The controller 2 then receives a success response from the device driver 3 indicating that re-initialization was successful (S24), and changes its own status from waiting for error recovery to normal (S25).

If an initialization request is asserted as part of the error handling process from the application 1 (S26), the controller 2 returns a success response to the initialization request to the application 1 without passing the initialization request to the device driver 3 (S27). More specifically, even if an initialization request is received from the application 1, the device driver 3 initialization process is not actually executed. The application 1 that received the success response to the initialization request then determines that the device driver 3 error handling process ended and reasserts request A (S28).

The controller 2 receiving request A then checks its own status (normal or waiting for error recovery). Because the controller 2 status is normal at this time (that is, the device driver 3 recovered from the error and is operating normally), the controller 2 bridges the request A to the device driver 3 (S29).

The device driver 3 receiving the request A then executes process A based on request A (S30), and returns a success response indicating that process A executed successfully to the controller 2 (S31). The controller 2 then bridges the success response to request A from the device driver 3 to the application 1 (S32).

The application 1 then asserts the next request (request B) following request A.

By thus introducing a controller 2 according to this embodiment of the invention to an application 1 that executes an initialization process (initialization request) as the error handling process regardless of the status of the device driver 3 or the error content, the performance of the entire process can be improved because the device driver 3 initialization process is not executed in response to the initialization request asserted as the error handling process by the application 1.

Figure 4:
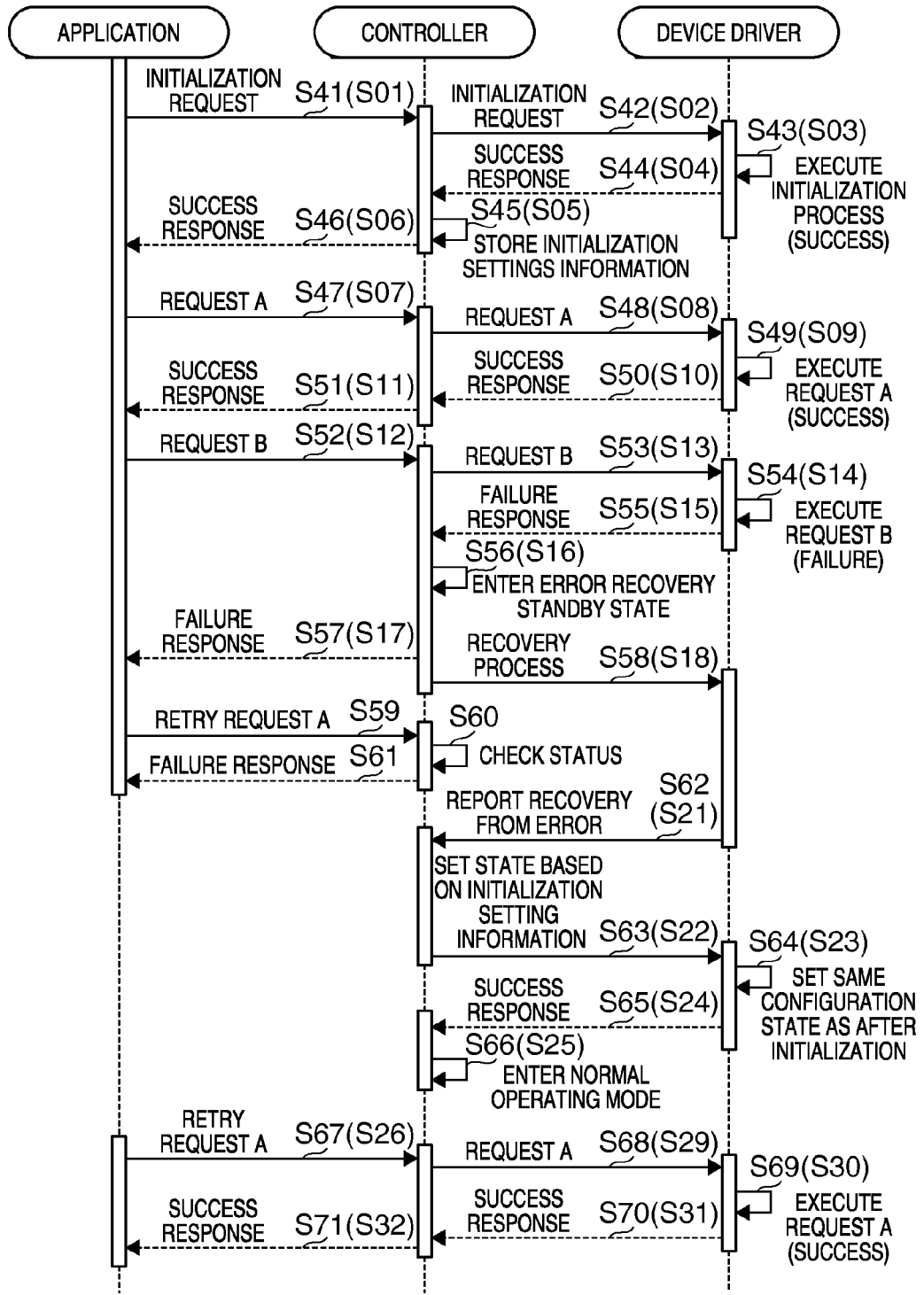
FIG. 4 is a sequence diagram describing an example of a controller process for an application that does not execute an error handling process.

The operation shown in FIG. 4 is described next. FIG. 4 is a sequence diagram describing the process executed by the controller 2 when the application 1 does not execute an error handling process. The sequence shown in FIG. 4 differs from that in FIG. 3 in that the application 1 retries the request instead of executing an error handling process when an error occurs in the device driver 3. The differences between the sequences in FIG. 3 and FIG. 4 are described next.

If a failure response to request B is received in step S57, the application 1 resends request A to the controller 2 (S59). The controller 2 receiving request A then checks its own status (normal or waiting for error recovery) (S60). Because the controller 2 status is waiting for error recovery at this time (because a device driver 3 error occurred), the controller 2 returns a request B failure response to the application 1 without passing the request A to the device driver 3 (S61).

More specifically, the controller 2 does not pass requests from the application 1 to the device driver 3 and returns a failure response to the application 1 until the device driver 3 recovers from the error as a result of the error handling process in step S58 (that is, as long as the device driver 3 returns an error). Because errors are thus handled on the controller 2 side, the controller 2 can also be used with an application 1 that retries a request when a request fails without executing a detailed error handling process.

Figure 5:
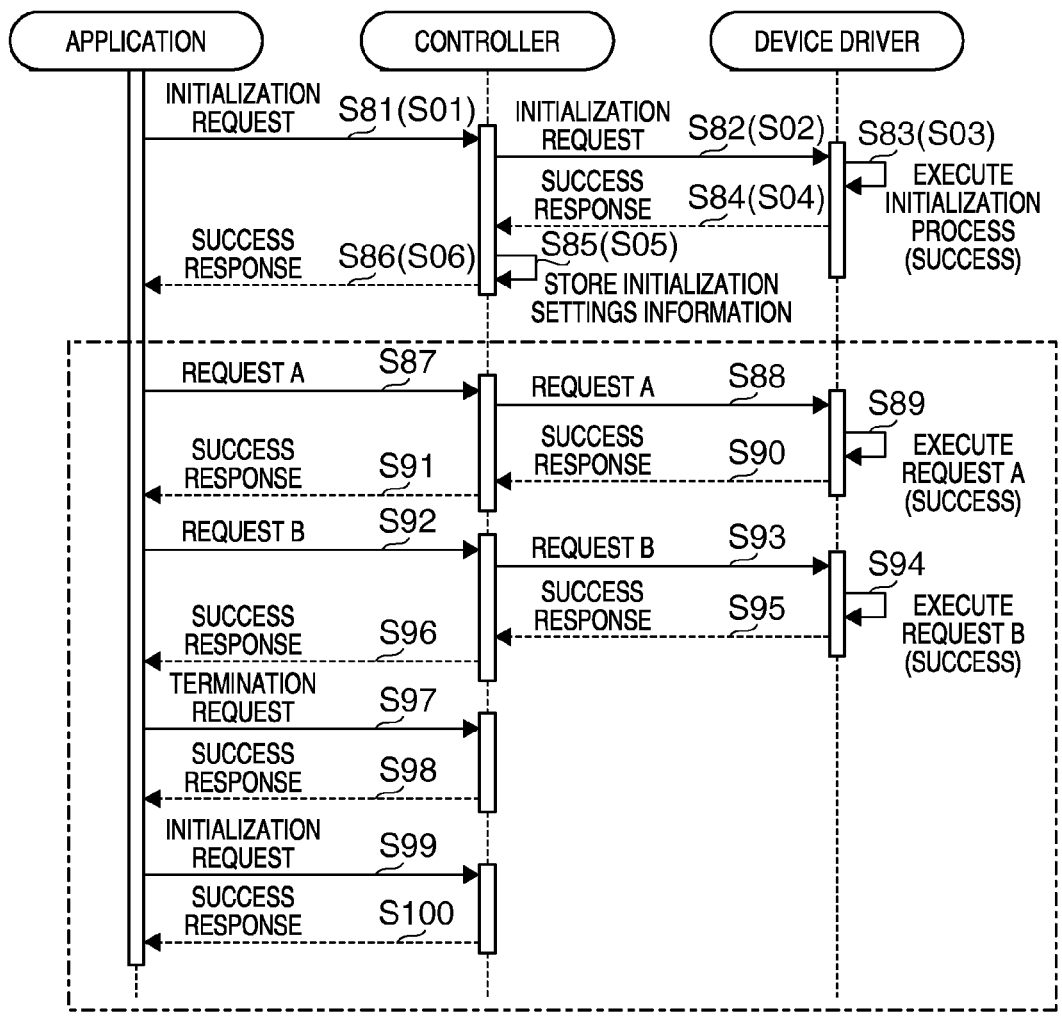
FIG. 5 is a sequence diagram describing an example of a controller process for an application that initializes the device driver each time a specific process is executed.

The operation shown in FIG. 5 is described next. FIG. 5 is a sequence diagram describing the process executed by the controller 2 when the application 1 executes the device driver 3 initialization process each time a specific process executes. In this example a process sequentially executes request A, request B, a termination request, and an initialization request as a single request set (process set), and the application 1 repeatedly executes this request set.

Note that the process from steps S81 to S86 is the same as the process from S01 to S06 in FIG. 3, and further description thereof is omitted here.

After the process from S81 to S86 is completed, the application 1 asserts a request to the controller 2 for the device driver 3 to execute a specific process A (request A) (S87).

The controller 2 that receives request A then checks the status of the device driver 3. Because the device driver 3 is operating normally at this time, the controller 2 bridges the request A to the device driver 3 (S88). The device driver 3 that receives request A executes process A based on request A (S89), and returns a success response indicating that process A was successful to the controller 2 (S90). The controller 2 then passes the request A success response from the device driver 3 to the application 1 (S91).

The application 1 then asserts a request (request B) to the controller 2 for the device driver 3 to execute a specific process B (S92). The controller 2 receives the request B and checks the status of the device driver 3. Because the device driver 3 is operating normally at this time, the controller 2 passes request B to the device driver 3 (S93). The device driver 3 that receives request B then executes process B based on request B (S94), and returns a success response indicating that process B executed successfully to the controller 2 (S95). The controller 2 then passes the success response to request B from the device driver 3 to the application 1 (S96).

When the application 1 then asserts a request (termination request) to end the process to the controller 2 (S97), the controller 2 returns a success response indicating that the termination request was successful to the application 1 without passing the termination request to the device driver 3 (S98). When the application 1 then asserts an initialization request to the controller 2 (S99), the controller 2 returns a success response indicating that the initialization request was successful to the application 1 without passing the initialization request to the device driver 3 (S100). The application 1 then repeats the process from step S87 to S100 (the range of steps enclosed by the dot-dash line).

As described above, the controller 2 according to this embodiment of the invention does not pass an initialization request to the device driver 3 even if the application 1 asserts an initialization request each time a specific process or series of steps are executed (at a specific timing). More specifically, the controller 2 does not execute the device driver 3 initialization process. As a result, processing performance can be improved by introducing a controller 2 according to this embodiment of the invention to an application 1 that requests an initialization process every time a particular process executes.

As described above, when a device driver 3 error occurs in this embodiment of the invention, the controller 2 executes an appropriate recovery process (error handling process) according to the status of the device driver 3 (more specifically, according to the error type). As a result, the process flow of the application 1 is simplified because the application 1 does not need to execute a detailed error handling process, and the cost of application development can be reduced.

Furthermore, the controller 2 stores the status of the device driver 3 after the first initialization process (stores the initialization settings information), and can reset the device driver 3 to the same state as after the initialization process is executed based on this initialization settings information after the device driver 3 recovers from an error. As a result, an initialization process that takes a long time, such as to initialize communications or an instance, is unnecessary, and process performance can be improved.

It should be noted that the application 1 may be simply configured to control a device using the first I/O interface 11 provided by the controller 2, and may execute a sequential process that determines for each process request whether the process was a success or failure and determines the next request based on the result of this decision, or it may execute a batch process that determines the success/failure of each process after executing a batch of plural requests and determines the next request based on the results of these decisions.

An application 1 that defines a plurality of requests in XML, which is a markup language, and batch processes the requests is conceivable as an example of the latter configuration. Even if the application 1 cannot execute a detailed error handling process because the application 1 executes plural processes in a single batch process, developing an application 1 that executes a batch process can be made easier by introducing a controller 2 according to the invention to handle errors appropriately.

The controller 2 according to the invention can also be used in a device driver 3 (UPOS compliant driver) that conforms to the UPOS (Unified POS) standard. Such a configuration can be achieved by implementing the interface (second I/O interface 12) between the controller 2 and the UPOS compliant driver as an interface that conforms to the UPOS specification.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A control method for a controller that is a module that replies a response to a request from an application, the control method comprising steps of:
   receiving the request from the application;
   determining if a received initialization request is a first initialization request received after the application started when the received request is an initialization request;
   storing initialization settings information describing a status after an initialization process based on the first initialization request, and storing the initialization settings information;
   detecting the status;
   executing a recovery process based on the status if the status is determined to be an error; and
   setting a state based on the stored initialization settings information when recovering from the error as a result of the recovery process, wherein a response to the initialization request is returned to the application according to the status if as a result of evaluating the received initialization request, the received initialization request is determined to not be the first initialization request.

2. The control method for the controller described in claim 1, wherein:
   the request defines a batch of plural requests.

3. The control method for the controller described in claim 1, wherein:
   the request is defined in a markup language.

4. A device comprising:
   a processor; and
   a memory storing code executable by the processor for implementing a controller that is a module that replies a response to a request from an application to the application, comprising:
   a request reception unit that receives the request from the application;
   an initialization request evaluation unit that determines if a received initialization request is a first initialization request received after the application started when the received request is an initialization request;
   an initialization settings information storage unit that stores initialization settings information describing a status after an initialization process based on the first initialization request;
   a status detection unit that detects the status;
   a recovery process unit that executes a recovery process based on the status if the status detection unit detects that an error occurred; and
   a set initialization settings request unit that sets a state based on the stored initialization settings information when recovering from the error as a result of the recovery process, wherein an initialization request processing unit returns a response to the received initialization request to the application according to the status if a result of the evaluation by the initialization request evaluation unit is that the received initialization request is not the first initialization request.

5. The device described in claim 4, wherein:
   the request defines a batch of plural requests.

6. The device described in claim 4, wherein:
   the request is defined in a markup language.

* * * * *

UNITED STATES PATENT AND TRADEMARK OFFICE
CERTIFICATE OF CORRECTION

| | |
|---|---|
| PATENT NO. | : 8,726,096 B2 |
| APPLICATION NO. | : 13/888285 |
| DATED | : May 13, 2014 |
| INVENTOR(S) | : Nobuhiko Nishimura et al. |

It is certified that error appears in the above-identified patent and that said Letters Patent is hereby corrected as shown below:

On the Title Page of the Letters Patent:

(72) Please delete "Nobuhiro Nishimura" and insert -- Nobuhiko Nishimura --

Signed and Sealed this
Ninth Day of September, 2014

Michelle K. Lee
*Deputy Director of the United States Patent and Trademark Office*